July 27, 1948.
A. KARRY
2,445,915
CUTTING BOARD FOR STEAM TABLES
Filed July 9, 1945
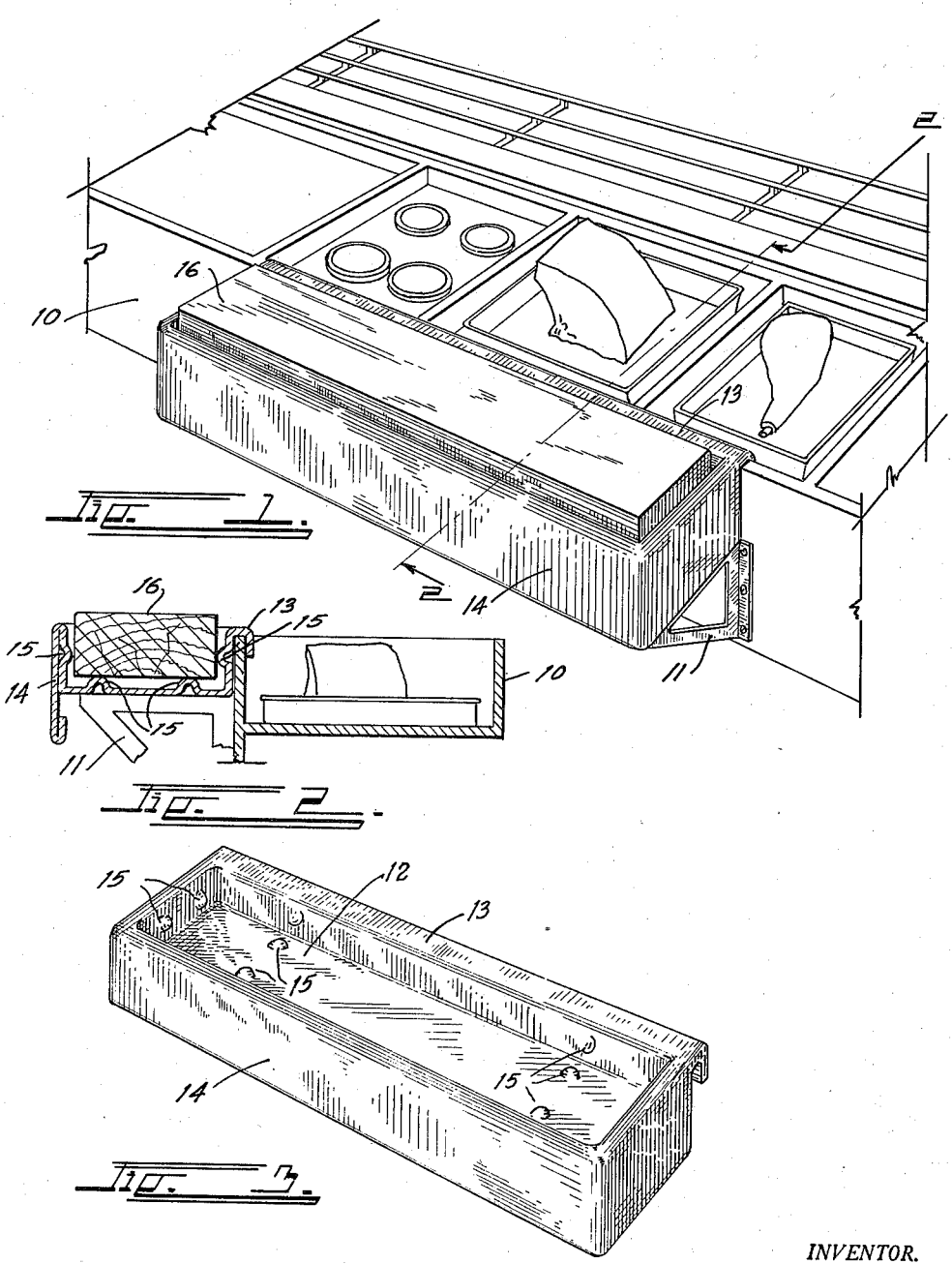
INVENTOR.
ANGELO KARRY.
BY
ATTORNEY.

Patented July 27, 1948

2,445,915

UNITED STATES PATENT OFFICE 2,445,915

CUTTING BOARD FOR STEAM TABLES

Angelo Karry, Denver, Colo.

Application July 9, 1945, Serial No. 603,872

1 Claim. (Cl. 146—215)

This invention relates to a cutting board for steam tables. The usual cutting board consists of a wooden board permanently secured along the front of the steam table.

Such boards are exceedingly difficult to keep clean and sanitary due to the fact that grease, oils and juices run into the space between the board and table and drip from the sides thereof. It is practically impossible to clean the space between the board and the table and the collected greases soon create an unsanitary condition.

The principal object of this invention is to provide a removable cutting board which can be simply lifted from place and washed with the pans and dishes, so that it may always remain clean and sanitary.

Another object of the invention is to provide a tray which will collect all greases and juices overflowing from the board, so that they cannot drip on to the floor, and to so construct this tray that it can be lifted from place and also washed with the pans and dishes.

A still further object is to so construct the holder that it will not be possible for fluids to enter between the holder and the steam table, so as to prevent contamination at this point.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view illustrating the improved cutting board in place on a typical steam table;

Fig. 2 is a cross-section therethrough, taken on the line 2—2, Fig. 1; and

Fig. 3 is a perspective view of the tray used in connection with the improved cutting board.

In Fig. 1 a typical steam table is indicated at 10.

The improved removable cutting board is supported from the front face of the table 10 upon suitable bracket members 11 which may be permanently secured to the table. An elongated tray 12 is supported by the brackets 11.

The rear edge of the tray 12, shown at 13 is hook-shaped so as to extend over the front edge of the table 10 to prevent the entry of fluids between the table and the tray. The forward edge of the tray is extended downwardly to form an apron 14 which projects below and conceals the brackets 11.

The bottom and side walls of the tray are indented inwardly to form projecting bosses 15. A wooden block or board 16 rests within the tray 12 upon the bosses 15 in the bottom thereof and against the bosses 15 in the sides thereof. The board 16 is of a thickness to project above the side walls of the tray and is used similarly to the present cutting boards or carving blocks with which steam tables are provided. In this case however, any oils, greases or juices exuding from the food will flow downwardly along the sides of the board inside of the walls of the tray 12 and collect in the bottom thereof.

The bosses 15 maintain the board out of contact with the walls so as to allow space for the passage of the foreign materials and the bosses 15 in the bottom of the tray support the board 16 above the bottom so as to allow space for the collection of the accumulated fluids.

It can be readily seen that when it is desired to clean up the steam table, the board 16 can be simply lifted from the tray 14 and the tray can be lifted from the steam table. Both can then be placed in the dishwashing pan and washed with the dishes, pots and pans so as to be clean and sanitary at all times.

Should the top of the board become damaged it is only necessary to lift it from the tray, invert it, and replace it therein.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

Means for supporting articles of food upon a steam table for cutting and slicing purposes, comprising: an elongated, rectangular tray bottom; end walls arising from the extremities of said bottom; side walls arising from the sides of said bottom and joining said end walls, the upper edges of said end walls and said side walls extending outwardly; an apron extending downwardly from each end wall and one of said side walls, the lower edges of said aprons being aligned on a horizontal plane below said bottom; a hook-like flange formed along the outwardly extending upper edge of the other side wall in parallel relation to the latter and adapted to receive and extend over the edge of the steam table throughout the length of said other side wall; a plurality of bosses formed in and extending upwardly from said bottom; a plurality of similar bosses formed in and extending inwardly from said side and end walls, said bottom, walls, aprons, and said hook-like flange being formed integrally from a single sheet of sheet metal; and a wooden block resting upon and against said bosses, said block having a thickness sufficient to elevate its upper surface above the plane of the outwardly extending upper edges of said side and end walls.

ANGELO KARRY.

REFERENCES CITED

The following references are of record in the file of this patent:

UNITED STATES PATENTS

| Number | Name | Date |
|---|---|---|
| 631,894 | Linkenbach | Aug. 29, 1899 |
| 668,036 | Cornell | Feb. 12, 1901 |
| 693,627 | Sharp | Feb. 18, 1902 |
| 1,179,505 | Coburn et al. | Apr. 18, 1916 |
| 1,481,030 | Schlickerling | Jan. 15, 1924 |
| 1,743,763 | Erickson | Jan 14, 1930 |
| 1,766,190 | Rosenberg et al. | June 24, 1930 |
| 2,338,695 | Lingel | Jan. 4, 1944 |